US008535594B2

(12) United States Patent
Luger et al.

(10) Patent No.: US 8,535,594 B2
(45) Date of Patent: Sep. 17, 2013

(54) METHOD FOR PRODUCING HOLLOW BODIES FROM PLASTIC AND HOLLOW PLASTIC BODIES WITH NOVEL PROPERTIES

(75) Inventors: Markus Luger, Hohenems (AT); Richard Geissler, Hoerbranz (AT)

(73) Assignee: Carcoustics Techconsult GmbH, Leverkusen (DE)

( * ) Notice: Subject to any disclaimer, the term of this patent is extended or adjusted under 35 U.S.C. 154(b) by 205 days.

(21) Appl. No.: 12/902,796

(22) Filed: Oct. 12, 2010

(65) Prior Publication Data

US 2011/0091673 A1    Apr. 21, 2011

(30) Foreign Application Priority Data

Oct. 16, 2009   (DE) .......................... 10 2009 045 769

(51) Int. Cl.
*B29C 51/10*          (2006.01)
(52) U.S. Cl.
USPC .......................... 264/511; 264/516; 264/571
(58) Field of Classification Search
None
See application file for complete search history.

(56) References Cited

U.S. PATENT DOCUMENTS

| 4,555,380 A * | 11/1985 | Munakata et al. ............. 264/510 |
| 4,740,417 A * | 4/1988 | Tornero ..................... 428/308.4 |
| 6,749,782 B2 * | 6/2004 | Chen ............................. 264/46.5 |
| 6,852,268 B1 | 2/2005 | Valyi et al. |
| 2002/0170657 A1 | 11/2002 | Campbell et al. |
| 2004/0129379 A1 | 7/2004 | Cudney et al. |
| 2005/0175794 A1 | 8/2005 | Dathe |

FOREIGN PATENT DOCUMENTS

| DE | 4029685 A1 | 3/1992 |
| DE | 10311421 A1 | 9/2004 |
| DE | 102005029729 | 12/2006 |
| DE | 102005045794 | 4/2007 |
| EP | 0185839 A2 | 7/1986 |
| EP | 0775354 B1 | 3/1999 |
| FR | 2852551 A1 | 9/2004 |

OTHER PUBLICATIONS

European Search Report of the European Patent Office for European Application No. EP20100163121, published on Mar. 27, 2011.

* cited by examiner

*Primary Examiner* — Monica Huson
(74) *Attorney, Agent, or Firm* — McCarter & English, LLP

(57) ABSTRACT

A hollow plastic body comprises a material composite consisting of a stamp-formed panel or sheet-like first layer of a first thermoplastic synthetic material, an optionally stamp-formed panel or sheet-like second layer of a second synthetic material, and an open-cell or mixed-cell foam layer of a third synthetic material disposed between the first and the second layer. The foam layer may be compressed at least in some sections in accordance with the stamped form of the first layer and/or the second layer. The foam layer may be in mechanical contact with the first or/and second layer substantially only in the compressed sections. Advantageous manufacturing methods for hollow plastic bodies are further disclosed.

19 Claims, 5 Drawing Sheets

METHOD FOR PRODUCING HOLLOW BODIES FROM PLASTIC AND HOLLOW PLASTIC BODIES WITH NOVEL PROPERTIES

CROSS-REFERENCE TO RELATED APPLICATIONS

This patent application claims priority to co-pending German Patent Application DE 10 2009 045 769.0, filed Oct. 16, 2009 which is hereby expressly incorporated by reference in its entirety as part of the present disclosure.

FIELD OF THE INVENTION

The present invention relates to the field of producing hollow bodies from plastics, in particular to a method of producing hollow plastic bodies by means of a heated forming tool. The present invention further relates to hollow plastic bodies with novel properties.

BACKGROUND OF THE INVENTION

A plurality of manufacturing processes for producing hollow plastic bodies is known from the prior art. In the simplest case, two separate halves of a hollow plastic body, such as of a fuel tank for a motor vehicle, are formed from a thermoplastic synthetic material, for example by compression molding, which are then, for example, thermally welded together in a subsequent process step. This manufacturing process is comparatively laborious because the individual steps cannot be carried out in a machine. Moreover, the stress-resistance of the produced weld is rather low.

Higher-quality hollow plastic bodies that have a high mechanical stress-resistance, e.g. in relation to a super-atmospheric internal pressure, may be produced by means of the so-called blow molding extrusion technique. For this purpose, a tube is extruded from a thermoplastic synthetic material, which is expanded by means of air blown in and fed to the cavity of a heated molding tool. Seamless hollow bodies with a more complex shape can in that case also be molded in the cavity. Seams that weaken the structure can be minimized in this way. Modern blow molding methods even permit varying wall thickness in the hollow body produced. Blow molding methods can be used, for example, for producing bottles, canisters, barrels, tanks, pipes and tubes. But hollow bodies with a more complex shape, such as highly tight fuel tanks, structural parts or engine compartment enclosures for motor vehicles, and even transport pallets can be produced by means of the blow molding technique. One draw-back of the blow molding technique is the comparatively high machine expenditure, which prohibits employing this technique for small quantities. In addition, combinations of different materials, for example with different chemical or physical properties, are not possible.

SUMMARY OF THE INVENTION

In accordance with a first aspect, it is an object of the present invention to provide a method for producing hollow plastic bodies that can be employed rationally also in the case of small quantities.

It is another object of the invention to provide a hollow plastic body with improved properties as well as a method for its production.

The present invention further relates to various advantageous developments of the method according to the invention and of the hollow plastic body according to the invention, which—so far as is technically feasible—can be combined with each other in any way.

The method according to the invention is provided for producing hollow plastic bodies and comprises the following process steps:

(1) providing a material composite consisting of:
   (a) a panel or sheet-like first layer of a first thermoplastic synthetic material,
   (b) a panel or sheet-like second layer of a second synthetic material,
   (c) a panel-like, open-cell or mixed-cell foam layer of a third synthetic material disposed between the first and the second layer,
(2) feeding the material composite to the opened cavity of a heated molding tool, and
(3) closing the molding tool, wherein pressure is applied onto the material composite at least in some sections such that, in the pressurized sections, the first and/or second layer is thermoformed and the foam layer is compressed, which results in a permanent deformation, at least of the first layer and/or the second layer from their preferred plane initial configuration, and of the foam layer.

The process according to the invention permits the production of hollow plastic bodies, the interior of which is entirely or partially filled with a foam. In this case, process control can be selected such that the first or/and second layer, in the molding tool, detaches from the foam layer in such a way that the foam layer is in mechanical contact with the first or/and second layer substantially only in the compressed sections. An air or gas-filled void, which can preferably be sealed on all sides, forms in the areas without mechanical contact. The air or gas, which apart from the remaining foam layer fills the voids created, to a substantial extent stems from the cells in the compressed areas of the previously open-cell or mixed-cell foam layer. However, it is also possible that the foam layer substantially completely fills the voids created.

The formation of air or gas-filled voids can be facilitated by drawing air from the cavity when the molding tool is being closed. In particular, a negative pressure can be produced in the cavity when air is being drawn out. As an alternative or aid, air or an inert filling gas can be blown between the first layer and the foam layer or/and the second layer and the foam layer, which additionally promotes the formation of air or gas filled structures.

In an alternative embodiment of the method, which, however, is also comprised by the scope of the present application, the foam layer is omitted completely. The formation of the hollow chambers is aided by blowing in air between the first and the second layer of synthetic material and/or by drawing out air from the cavity of the molding tool during closing it or by generating a negative pressure in the cavity.

In a preferred embodiment of the method, the first layer is preferably thermally welded, in the pressurized sections, to the second layer and/or to the foam layer. Welding can, however, optionally be carried out by means of other welding techniques. In particular, welding can be carried out such that it mechanically connects the material composite at the edges at least in some areas, preferably, however, along the entire periphery, so that an interior space is produced which is completely sealed against the environment. The first layer of synthetic material is thus preferably welded to the first foam layer and/or the second layer of synthetic material in such a way that the hollow plastic body produced encloses a substantially completely sealed air/gas compartment.

It is of pivotal importance for an effective process control that the first and second synthetic material can be welded to each other, in particular by means of thermal welding. Furthermore, it has proved to be advantageous if the third synthetic material preferably can also be thermally welded to the first and/or the second synthetic material.

As described above, the first synthetic material may be a thermoplastic. In some embodiments, the second and the third synthetic material is also a thermoplastic. In this case, both the first and the second synthetic material can advantageously be selected from the group consisting of the materials ABS, GMT, LWRT, PMMA, PVC, PE, PET, PS, PP, PSEVOHPE, PPEVOHPE, PEEK. The second and/or particularly the third synthetic material can also be a duroplastic or an elastomer. However, the third synthetic material is particularly preferably a foamed synthetic material selected from the group consisting of the materials PUR, PPE, PSE, PVCE, NBR, PF. The foam should be open-cell or mixed-cell. If a thermoplastic foam is selected, then the use of a closed-cell foam can possibly also be possible and advantageous.

The method according to the invention is particularly advantageous in that the first and second synthetic material can, but need not be, chemically and/or physically different. Thus, the first and second synthetic material can have different colors, resulting in design-related advantages which may become relevant, for example, in the production of noise protection elements with a visible side and a functional side. Moreover, the panel or sheet-like first synthetic material can have different mechanical properties from the panel or sheet-like second synthetic material, for example by using different material thicknesses of one and the same synthetic material. Alternatively, either the second synthetic material can also be a fiber-reinforced synthetic material (GMT, LWRT) having a high impact resistance. In contrast, the first synthetic material can be an unfilled/unreinforced thermoplastic, such as PP, which is excellent to thermoform. Such a combination of materials can, for example, be used advantageously for producing acoustically effective engine compartment enclosures, with the reinforced side facing in the direction of the vehicle underbody, and the PP side in the direction of the engine compartment. The PP side then forms the acoustically effective structures.

A hollow plastic body according to the invention comprises a material composite comprising at least the following components:
(i) a stamp-formed, panel or sheet-like first layer of a first thermoplastic synthetic material,
(ii) an optionally press-formed, panel or sheet-like second layer of a second synthetic material,
(iii) an open-cell or mixed-cell foam layer of a third synthetic material disposed between the first and the second layer,
(iv) wherein, the foam layer is compressed at least in some sections in accordance with the stamped form of the first layer and/or the second layer.

In this case, the hollow plastic body is preferably configured such that the foam layer is in mechanical contact with the first or/and second layer substantially only in the compressed sections. In the areas therebetween, the hollow plastic body preferably forms air or gas-filled voids or chambers. However, it is also possible that the foam layer substantially completely fills the voids or chambers created.

Preferably, in the hollow plastic body according to, the invention, the first layer in the compressed sections is preferably thermally welded to the second layer and/or the foam layer, advantageously such that the weld connects the material composite at least in some areas at the edges. Particular advantages result if the hollow plastic body encloses a substantially completely sealed air compartment, e.g. by means of a substantially complete peripheral thermal weld. For example, it has proved to be particularly advantageous for the production process of a hollow plastic body according to the invention if the first and the second synthetic material can be thermally welded to each other. In that case, the hollow plastic body can be produced particularly simply and efficiently by means of a preferred embodiment of the method according to the invention. Even more improved product properties are obtained if, furthermore, the third synthetic material preferably can also be thermally welded to the first and/or the second synthetic material.

With regard to selecting the first, second and third synthetic material, reference is made to the above comments on the selection of materials and the chemical or physical properties in the context of the method according to the invention, which are immediately transferable to the hollow bodies according to the invention.

Other advantages and features of the method according to the invention and of the hollow body according to the invention are apparent from the dependent claims as well as from the exemplary embodiments discussed below. These are to be understood to be examples and non-limiting, and will be explained in more detail with reference to the drawing.

DETAILED DESCRIPTION OF THE INVENTION

Figure 1:
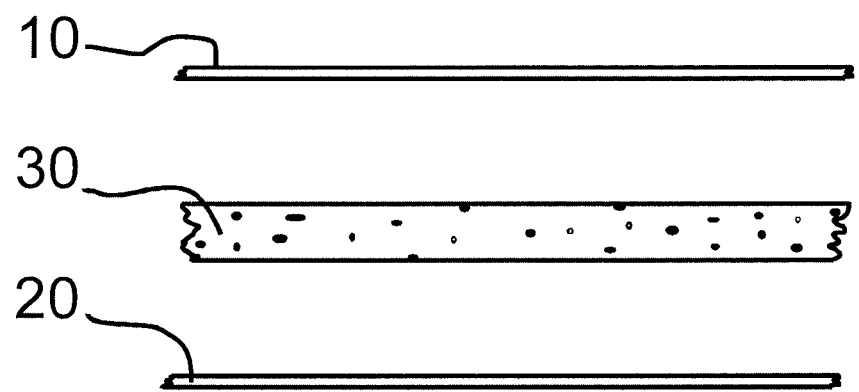
FIG. 1 shows a material composite for carrying out the method according to the invention.

FIG. 1 shows the individual components of a material composite with which the method according to the invention is carried out. The material composite comprises a first layer 10 consisting of a thermoplastic material, such as PP, which is panel-shaped and has a thickness in the range of between 0.5 and 2.5 mm. A second layer 20, which also consists of a thermoplastic synthetic material, but which is reinforced, for example, with glass fibers and has an increased thickness in the range of between one and five millimeters, is disposed on the underside.

Figure 2:
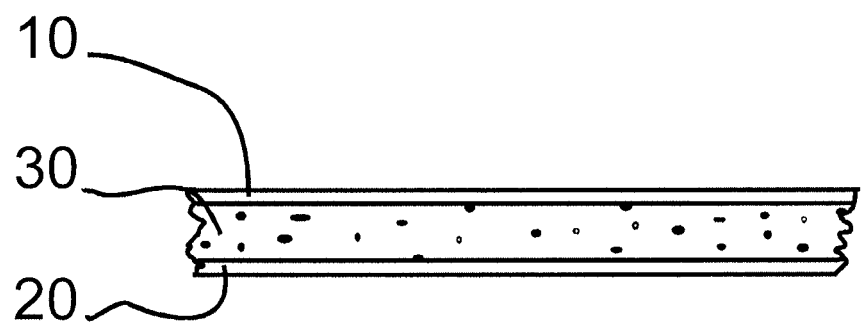
FIG. 2 shows a material composite for carrying out the method according to the invention.

A foam layer 30 consisting of an open-cell synthetic material, for example of PUR (generally duroplastic or elastomeric) is disposed between the first layer 10 and the second layer 20. The thickness of this foam layer is generally between one and twenty millimeters, but may be more or less. Besides open-cell foams, the use of mixed-cell foams is also possible in principle. While FIG. 1 shows the individual layers of the material composite individually for illustrative purposes, FIG. 2 shows the material composite in the form in which it is supplied to the cavity of a molding tool 40.

Figure 3:
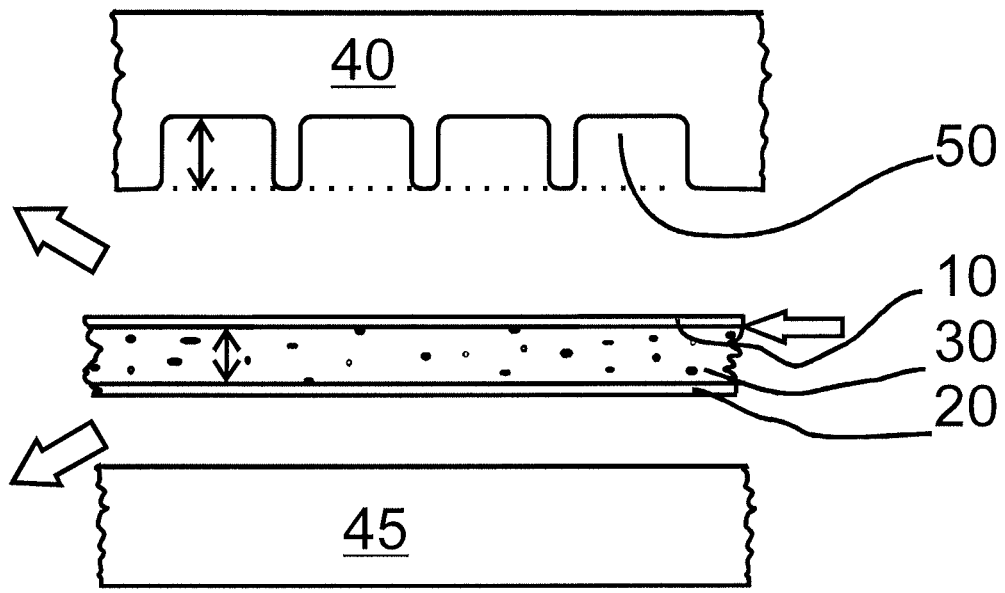
FIG. 3 shows the material composite inserted in the opened cavity of the molding tool.

FIG. 3 shows the opened cavity of a molding tool, which forms a first mold half 40 and a second mold half 45. The two mold halves 45 are heated and moveable relative to each other, so that the cavity formed between the form halves 40 and 45 can be closed. Such a molding tool is known from the prior art and is thus not described in greater detail. The molding tool can be heated directly by means of heating elements integrated into the form halves 40, 45. However, it can also be disposed on heatable tool tables of a hot-plate press, so that the mold halves 40, 45 are heated via the tool tables, which are not shown in FIG. 3. Common operating temperatures for the molding tools are in the range of 250° C. to about 350° C., depending on the (thermoplastic) synthetic material, preferably in the temperature interval between 250° C.-270° C. and 300° C.

Figure 4:
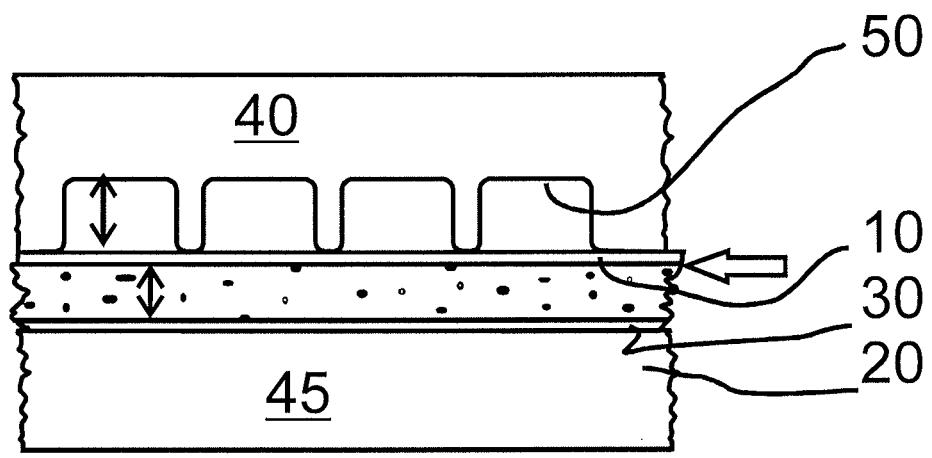
FIG. 4 shows the molding tool with the inserted material composite during the closing process.

FIG. 4 shows the start of the closing process of the molding tool by moving the mold halves 40, 45 relative to each other, with the material composite inserted in the cavity of the molding tool also being shown. In this case, arrows indicate that the thickness of the foam layer 30 is less than the depth of the shapes of the structures formed in the upper mold half 40.

Figure 5:
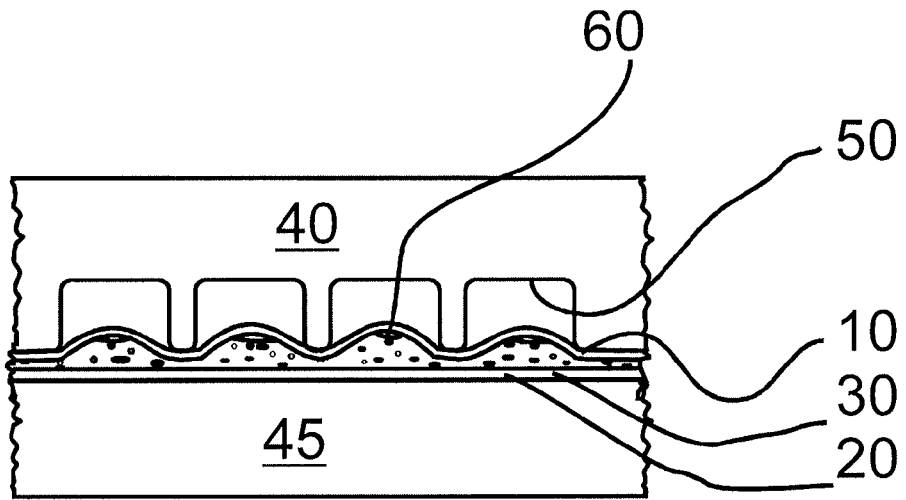
FIG. 5 shows the largely closed molding tool with the inserted material composite in which hollow bodies begin to form.

FIG. 5 shows the compression of the material composite occurring when closing of the mold halves is continued, the compression being accompanied by the first layer 10 becoming detached from the underlying foam layer 30 in the area of the voids 50 of the first mold half 40 of the molding tool. In these areas, the foam layer 30 is compressed to a lesser extent than in the surrounding areas.

Figure 6:
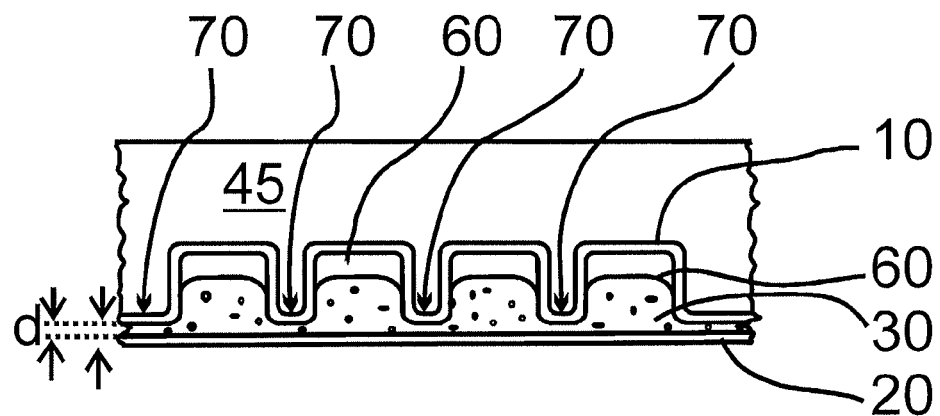
FIG. 6 shows the completely closed molding tool with the inserted material composite in which hollow bodies have formed.

FIG. 6 shows the closed state of the molding tool, in which box-like structures have formed in the first layer 10 by thermal deformation of the first layer 10. Furthermore, an irreversible deformation of the foam layer 30 has taken place in the sections pressurized by the mold halves 40, 45 of the molding tool, which is accompanied by a thermal welding of the material composite in these areas. An air-filled volume designated 60 is located within the box-shaped structures, besides the foam layer 30 (which, locally, is compressed only slightly or not at all). In this case, the shape of the molding tool is selected such that the interior of the produced box structure is completely sealed against the environment. This is ensured by thermally welding the material composite on all sides by an uninterrupted welding seam.

The formation of the air-filled box structures in the context of the method according to the invention cited above is primarily based on the fact that, when the mold halves 40 and 45 of the molding tool are closed, air captured in the pores of the open or mixed-cell foam of the foam layer 30 escapes and leads to an inflation of the chamber structures. This inflation can be aided in process control by air being drawn out of the cavity of the molding tool when the molding halves of the molding tool are being closed. In particular, this can be carried out by generating a certain negative pressure in the molding tool, so that the first layer 10, which has been made mobile by heating, is "sucked" into the box structures of the upper molding half 40 of the molding tool. This evacuation of the interior of the cavity is indicated by the arrows in FIG. 3 pointing out of the cavity.

Moreover, the formation of the air or gas-filled (here: box) structures can be aided additionally in the context of the manufacturing process of according to the invention, if air or (inert) gas is blown in, preferably in the area of the foam layer 30, particularly preferably into the area captured between the foam layer 30 and the first layer 10 and/or the second layer 20, when the material composite is being fed to the cavity of the molding tool. This can take place, for example, while feeding the panel-shaped first layer 10 and the panel-shaped foam layer 30, by blowing in pressurized air or another inert gas between these layers.

Figure 7:
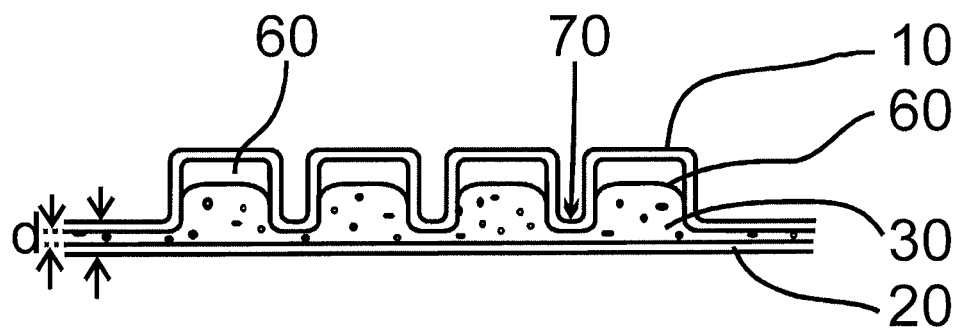
FIG. 7 shows a first variant of the product according to the invention, produced in accordance with the method according to the invention.

The box structure produced when the method according to the invention is carried out in the exemplary embodiment discussed is shown once again in FIG. 7 in a first variant in which it is ensured, by means of the special process control, that a residual material thickness d of the foam layer 30 remains in the compressed sections 70 of the structure. This residual material thickness d can be specifically set by the process control and the shaping of the molding tool. In the shown first product variant, it is typically between 0.1 and 1 mm.

Figure 8:
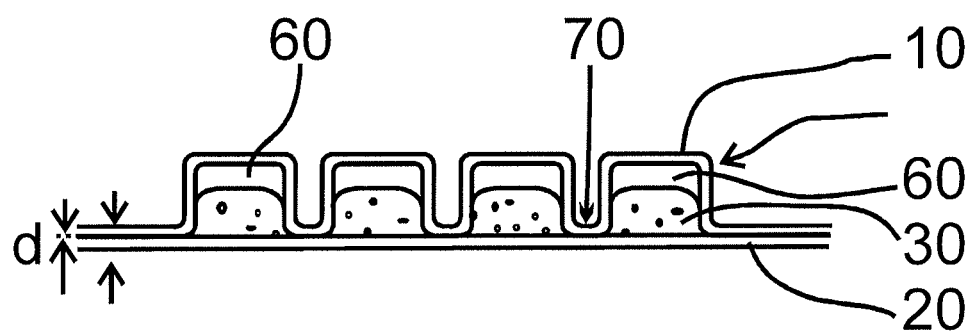
FIG. 8 shows a second variant of the product according to the invention, produced in accordance with the method according to the invention.

FIG. 8 shows a second product variant that substantially corresponds to the product variant apparent from FIG. 7, wherein the process control was selected such that the PUR foam material of the foam layer 30 was displaced virtually completely in the compressed sections 70, in the production of the product shown in FIG. 8. Accordingly, this is a practically direct weld connection of the first layer 10 with the second layer 20, which can lead to an increased strength of the material composite in the finished product.

Figure 9:
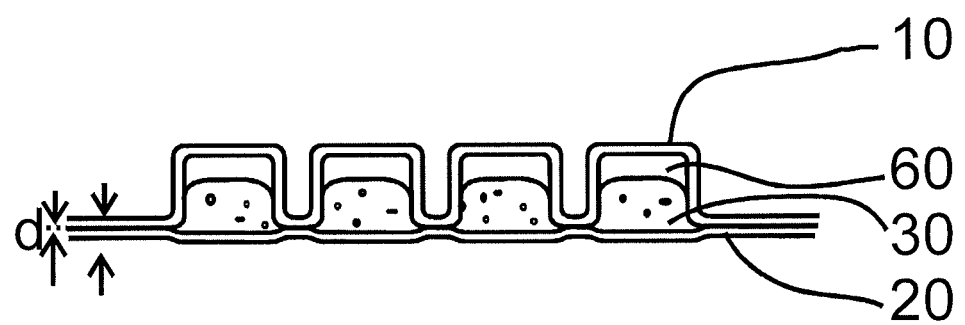
FIG. 9 shows a third variant of the product according to the invention, produced in accordance with the method according to the invention.

Finally, FIG. 9 shows a third variant of the finished product which was produced by means of a molding tool, in which the lower molding half 45 is also structured such that the second layer 30 is also pressurized locally, so that opposite depressions are formed both in the first layer 10 as well as in the second layer 20. It is particularly simple in this variant to displace virtually the entire material of the foam layer 30 from the compressed sections 70 and thus obtain a mechanically particularly highly stress-resistant weld connection of the first layer 10 with the second layer 20.

Finally, reference is made to the fact that the use of an open-cell or mixed-cell foam layer 30 disposed between the first layer 10 and the second layer 20 has proved to be particularly advantageous for the method according to the invention. Within the context of practical tests of the method according to the invention, however, it was found that a foam layer 30 can be dispensed with entirely, given a suitable process control, in particular if, when the material composite is fed to the cavity of the molding tool, air is additionally blown between the first layer 10 and the second layer 20 and/or air is drawn out of the cavity of the molding tool, in particular setting a negative pressure in the cavity of the molding tool.

The particular advantage of the method according to the invention in all its special embodiments lies in the fact that the requirements with regard to the machine tools to be used are significantly reduced as compared with the blow-molding machines frequently used for producing hollow plastic bodies. Therefore, the method according to the invention is particularly suitable for producing small series of hollow plastic bodies which could not be produced rationally using the blow-molding technique.

In particular, the product according to the invention is advantageous in that various material combinations of the first layer 10 and the second layer 20 can be prepared, which in particular makes it possible to realize individual aesthetic designs for example by coloring the first layer 10 and the second layer 20 differently. Moreover, special requirements with regard to the physical or chemical properties of the first layer 10 and the second layer 20 can be realized. For example, there may be cases of application in which a very high mechanical stability of the second layer 20, which forms a more ore less plane surface, is desired. As an example, reference may be made to an engine compartment enclosure for a motor vehicle as it is apparent from EP0775354B1, for example. The underside of the engine compartment enclosure at the same time forms the vehicle underside, and must therefore have an increased mechanical stress-resistance. Fiber-reinforced, thermoplastic synthetic materials such as GMT or LWRT are particularly suitable for this purpose. However, particularly good acoustic properties are obtained if the box structure directed towards the engine compartment is fabricated from a thinner material with good vibrating capabilities, such as, for example, PP.

What is claimed is:

1. A method for producing hollow plastic bodies by means of a heated molding tool, which forms a cavity, comprising the steps of:
   a. providing a material composite consisting of:
      i. a first panel or sheet layer of a first thermoplastic synthetic material,
      ii. a second panel or sheet layer of a second synthetic material, and
      iii. a panel-like, open-cell or mixed-cell foam layer of a third synthetic material disposed between the first and the second layer;
   b. feeding the material composite to the opened cavity of a heated molding tool; and
   c. closing the molding tool, wherein pressure is applied onto the material composite at least in some sections such that, in the pressurized sections, at least one of the first layer and the second layer is thermoformed and the foam layer is compressed, which results in a permanent deformation of at least one of the first layer and the second layer, and of the foam layer;
   and further comprising a process control in which at least one of the first layer and the second layer, in the molding tool, detaches partially from the foam layer in such a way that the foam layer is in mechanical contact with at least one of the first layer and the second layer substantially only in the compressed sections.

2. The method of claim 1, wherein air is drawn out of the cavity when the molding tool is being closed.

3. The method of claim 2, wherein a negative pressure is generated in the cavity when air is being drawn out.

4. The method of claim 1, wherein air or an inert filling gas is blown between the foam layer and at least one of the first layer and the second layer when the material composite is being fed to the cavity of the molding tool.

5. The method of claim 1, wherein the first layer is thermally welded, in the pressurized sections, to at least one of the second layer and the foam layer.

6. The method of claim 5, wherein said welding connects the first layer to at least one of the second layer and the foam layer at least in some areas at the edges.

7. The method of claim 5, wherein the first layer is thermally welded to at least one of the foam layer and the second layer in such a way that the hollow plastic body produced encloses a substantially completely sealed inner space.

8. The method of claim 5, wherein the first synthetic material and the second synthetic material can be thermally welded to each other.

9. The method of claim 5, wherein the third synthetic material can be thermally welded to at least one of the first synthetic material and the second synthetic material.

10. The method of claim 1, wherein at least one of the second synthetic material and the third synthetic material is selected from one of a thermoplastic, a duroplastic and an elastomer.

11. The method of claim 1, wherein at least one of the first synthetic material and the second synthetic material is selected from the group consisting of ABS, PMMA, PVC, PE, PET, PS, PP, PSEVOHPE, PPEVOHPE, and PEEK.

12. The method of claim 1, wherein the third synthetic material is selected from the group consisting of PUR, PPE, PSE, PVCE, NBR, and PF.

13. The method of claim 1, wherein the first synthetic material and the second synthetic material are chemically or physically different.

14. The method of claim 13, wherein the first synthetic material and the second synthetic material have different colors.

15. The method of claim 1, wherein the first layer has different mechanical properties from the second layer.

16. The method of claim 1, wherein the first layer has a different material thickness from the second layer.

17. A method for producing hollow plastic bodies by means of a heated molding tool, which forms a cavity, comprising the steps of:
   a. providing a material composite consisting of:
      i. a first panel or sheet layer of a first thermoplastic synthetic material,
      ii. a second panel or layer of a second synthetic material, and
      iii. a panel-like, open-cell or mixed-cell foam layer of a third synthetic material disposed between the first and the second layer;
   b. feeding the material composite to the opened cavity of a heated molding tool; and
   c. closing the molding tool, wherein pressure is applied onto the material composite at least in some sections such that, in the pressurized sections, at least one of the first layer and the second layer is thermoformed and the foam layer is compressed, which results in a permanent deformation of at least one of the first layer and the second layer, and of the foam layer;
   wherein air or an inert filling gas is blown between the foam layer and at least one of the first layer and the second layer when the material composite is being fed to the cavity of the molding tool.

18. The method of claim 17, wherein air is drawn out of the cavity when the molding tool is being closed.

19. The method of claim 18, wherein a negative pressure is generated in the cavity when air is being drawn out.

* * * * *